(12) United States Patent
Flandre et al.

(10) Patent No.: US 7,595,634 B2
(45) Date of Patent: Sep. 29, 2009

(54) METHOD OF DETERMINING THE ANGULAR POSITION OF A HEADLIGHT BY SEVERAL MAGNETIC FIELD MEASUREMENT MEANS

(75) Inventors: Loïc Flandre, Saint Maur des Fosses (FR); Rémy Letoumelin, Chessy (FR); Arnaud Uhrich, Paris (FR)

(73) Assignee: Valeo Vision, Bobigny (FR)

( * ) Notice: Subject to any disclaimer, the term of this patent is extended or adjusted under 35 U.S.C. 154(b) by 0 days.

(21) Appl. No.: 11/733,811

(22) Filed: Apr. 11, 2007

(65) Prior Publication Data
US 2007/0244655 A1 Oct. 18, 2007

(30) Foreign Application Priority Data
Apr. 12, 2006 (FR) .................................. 06 03221

(51) Int. Cl.
*G01B 7/30* (2006.01)
(52) U.S. Cl. ................................ 324/207.2; 324/207.25
(58) Field of Classification Search ................................
324/207.12–207.25, 173–174; 338/32 H, 338/32 R
See application file for complete search history.

(56) References Cited
U.S. PATENT DOCUMENTS

| | | | | |
|---|---|---|---|---|
| 4,622,644 A | | 11/1986 | Hansen | |
| 5,831,596 A | * | 11/1998 | Marshall et al. | 345/161 |
| 6,246,232 B1 | * | 6/2001 | Okumura | 324/207.2 |
| 6,867,582 B2 | * | 3/2005 | Muraji et al. | 324/207.2 |
| 6,873,233 B2 | * | 3/2005 | Sugiyama et al. | 335/205 |
| 7,132,824 B2 | * | 11/2006 | Masuda et al. | 324/207.12 |
| 7,170,285 B2 | * | 1/2007 | Spratte | 324/207.25 |
| 2004/0207392 A1 | | 10/2004 | Kernhof | |

FOREIGN PATENT DOCUMENTS

| | | | |
|---|---|---|---|
| DE | 4440214 A1 | * | 5/1996 |
| EP | 0856720 | | 8/1998 |
| EP | 1481846 | | 12/2004 |

* cited by examiner

*Primary Examiner*—Jay M Patidar
(74) *Attorney, Agent, or Firm*—Jacox, Meckstroth & Jenkins

(57) ABSTRACT

A measurement device and method for determining the angular position of a pivoting headlight by means of a measurement device that comprises at least one ferromagnetic element that emits a local magnetic field, first means of measuring the local magnetic field in projection on a first axis, the at least one ferromagnetic element being mounted so as to pivot with respect to the at least one first measurement means, and an electronic processing unit, the method comprising a measurement step, and a second processing step during which the electronic processing unit calculates the angular position of the headlight, that, during the measurement step, the intensity of the local magnetic field is measured in projection on a second axis orthogonal to a first axis, and that, during a second processing step, the electronic processing unit calculates a value representing the angle of the local magnetic field with respect to the first axis.

9 Claims, 3 Drawing Sheets

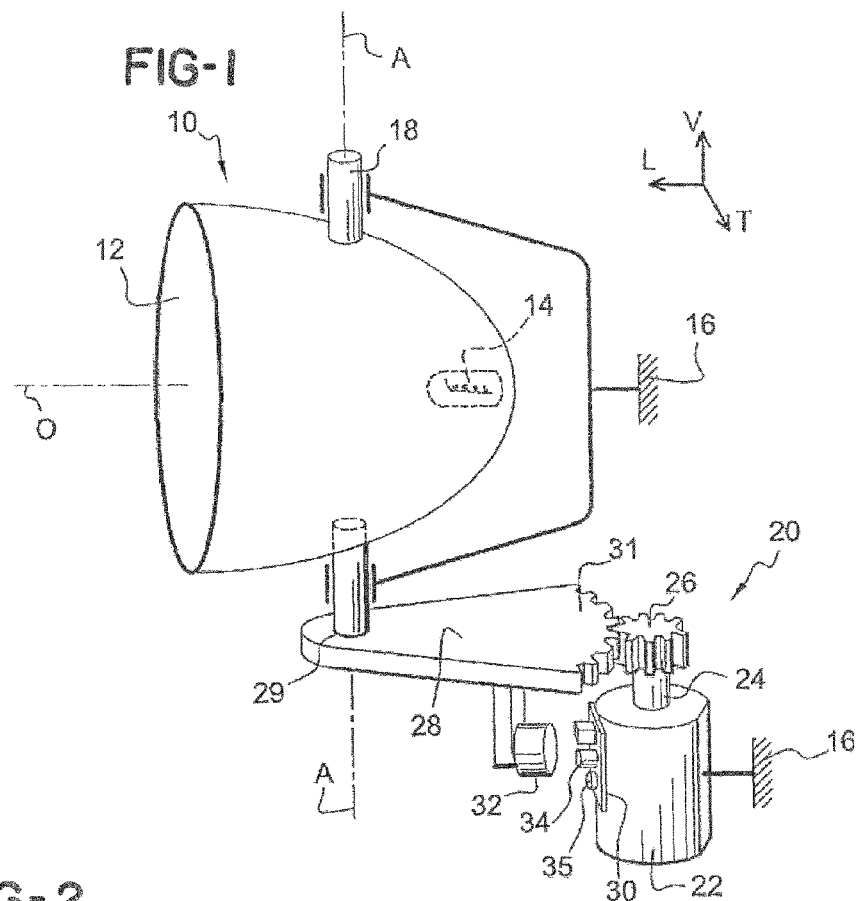
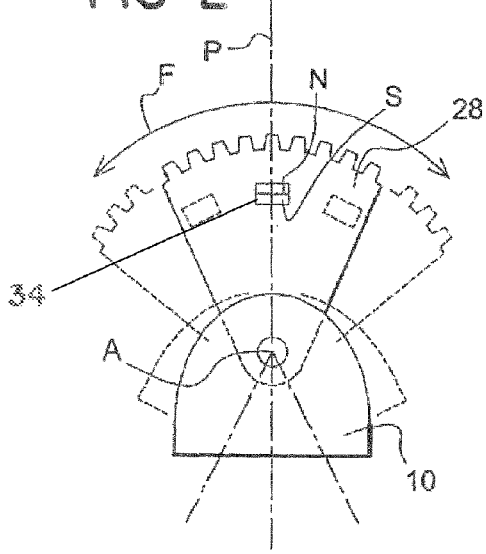
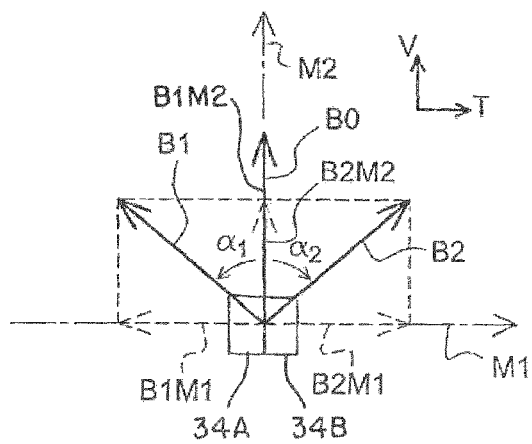

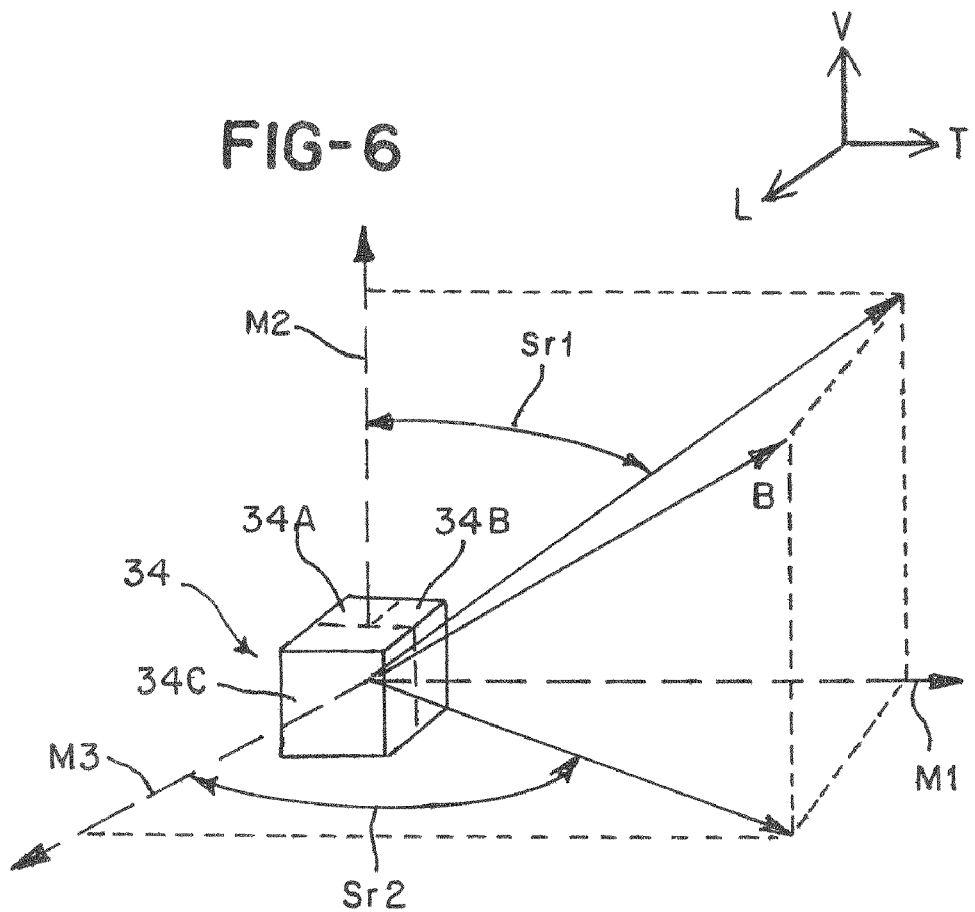

METHOD OF DETERMINING THE ANGULAR POSITION OF A HEADLIGHT BY SEVERAL MAGNETIC FIELD MEASUREMENT MEANS

CROSS-REFERENCE TO RELATED APPLICATIONS

This application claims priority to French Application No. 0603221 filed Apr. 12, 2006, which application is incorporated herein by reference and made a part hereof.

BACKGROUND OF THE INVENTION

1. Field of the Invention

The invention concerns a method of determining the instantaneous angular position of a headlight, in particular for a motor vehicle, that is mounted so as to pivot about a rotation axis in a predetermined range of movement.

2. Description of the Related Art

Some motor vehicles are in fact equipped with front headlights that are mounted so as to rotate about a vertical axis. Such a headlight makes it possible, for example when a vehicle is approaching a bend, to illuminate the portion of roadway that is situated in the curvature of the bend.

The invention is also applicable to headlights that are mounted so as to rotate about a transverse axis so as to correct the elevation of the headlight according to irregularities in the road.

Existing headlights often comprise stepping actuators or stepping motors. Whenever the actuator is powered up, an initialization phase, prior to the use of the actuator, is necessary in order to calibrate it. During this initialization phase, the headlight is brought into a neutral angular position. This neutral angular position corresponds to an orientation of the headlight when the motor vehicle is traveling in a straight line and/or at a constant speed.

The actuator generally has end-of-travel stops. During normal initialization phases, the actuator is brought against the stops. The actuator is thus deployed over its entire travel, as far as one of the stops. This stop position is then taken as the reference angular position in order to return the headlight to its neutral angular position, for example by counting a predetermined number of steps. The reference angular position therefore corresponds to one of the extreme angular positions of the headlight.

However, traveling over the whole of the travel of the stepping actuator in order to obtain the reference angular position of the headlight causes an unwanted movement of the headlight. This unwanted movement of the headlight may cause a nuisance or dazzling for a motorist traveling in the opposite direction. This is because a motorist passing a vehicle whose headlight is in the initialization phase may be dazzled by this headlight since the reference angular position corresponds to an extreme angular position that is liable to illuminate the road on which the other motorist is traveling.

Moreover, the unwanted movement of the headlight routinely impairs the availability of the headlight. This is because traveling over the whole of the travel of the actuator requires a not insignificant length of time, for example three seconds.

Measurement devices are also known that comprise sensors called copying or recopying sensors. These sensors emit an electrical measurement signal whose value represents the position of the headlight over an intermediate range of the range of movement of the headlight.

Thus, over this intermediate range, a value of the signal emitted by the sensors is associated with each angular position of the headlight about its rotation axis. It is thus possible to determine, for each value produced, the exact instantaneous angular position of the headlight over the intermediate range of angular positions.

This type of measurement device comprises for example a fixed Hall effect sensor that measures the intensity of the magnetic field emitted by a magnet that is mounted so as to pivot integrally with the headlight.

However, such a copying sensor is very expensive and complex to manufacture and calibrate.

In addition, the sensitivity of this type of sensor is not sufficient to precisely determine the instantaneous angular position of the headlight in end ranges of the range of movement of the headlight.

In addition, when this type of measurement device comprises a Hall effect sensor, the measurements made by the sensor are liable to be influenced by external constraints such as temperature or vibrations.

What is needed, therefore, is a system and method that overcomes one or more of the problems in the prior art.

SUMMARY OF THE INVENTION

To resolve these problems, one embodiment of the invention proposes a method comprising a measurement step during which an intensity of a local magnetic field is measured in projection on at least a second measurement axis orthogonal to the first measurement axis by means of at least second measurement means that emit a second electrical measurement signal representing the intensity of the local magnetic field along the second measurement axis, and in that, during the second processing step, the electronic processor unit calculates a value representing an angle of a local magnetic field with respect to the first measurement axis in projection on the plane defined by the two measurement axes.

The invention concerns more particularly a method of determining the instantaneous angular position of a headlight, in particular for a motor vehicle, that is mounted so as to pivot about a rotation axis in a predetermined range of movement delimited by two extreme angular positions, by means of a measuring device that comprises:

at least one ferromagnetic element that emits a magnetic field that is defined at any point in space by a direction and an intensity, at least first measurement means that are able to emit a first electrical measurement signal that represents the intensity of the local magnetic field in projection onto a first axis, the ferromagnetic element being mounted so as to pivot with respect to the first measurement means about a pivot axis between two extreme angular positions corresponding respectively to the extreme angular positions of the headlight;

an electronic processing unit;

the method comprising a step of measuring the intensity of the local magnetic field in projection on the first axis, and a second processing step during which the electronic processing unit calculates the angular position of the headlight from the value of the electrical measurement signal.

Such a method is particularly adapted for measuring or determining the instantaneous angular position of a motor vehicle rotary headlight/

According to other characteristics of various embodiments of the invention:

the second measurement axis lies in a plane orthogonal to a pivot axis of a ferromagnetic element with respect to the at least one second measurement means;

the second measurement axis lies in a plane parallel to a pivot axis of a ferromagnetic element with respect to the at least one second measurement means;

during the first measurement step, the intensity of the local magnetic field is measured in projection on a third measurement axis that is orthogonal to the first and second measurement axes by third measurement means, and in that, during the processing step, the electronic processing unit calculates the angle of the local magnetic field with respect to the first measurement axis in the plane comprising the first and third measurement axes;

during the second processing step, the values of the measurement signals are weighted by correction coefficients so that the value calculated by the electronic processing unit is linearly proportional to an angular position of the headlight throughout the range of movement;

during the second processing step, the values calculated by the electronic processing unit are weighted by correction coefficients so that the value calculated by the electronic processing unit is linearly proportional to the angular position of the headlight throughout the range of movement According to other characteristics of the invention:

Another embodiment of the invention also proposes a measurement device for implementing the method according to the invention comprising at least two Hall effect sensors that are able to measure the intensity of the local magnetic field B in projection on measurement axes substantially orthogonal to one another and a ferromagnetic element.

According to other characteristics of the device:

the Hall effect sensors are arranged close to one another;

the Hall effect sensors are incorporated in the same electronic element;

the ferromagnetic element is arranged so that each angular position of the headlight is associated with a single direction of the local magnetic field;

the ferromagnetic element is offset radially with respect to the pivot axis between the two extreme angular positions corresponding respectively to the extreme angular positions of the headlight.

Other characteristics and advantages of the invention will emerge during the reading of the following detailed description, for an understanding of which reference will be made to the accompanying drawings, among which:

BRIEF DESCRIPTION OF THE ACCOMPANYING DRAWINGS

FIG. 1 is a perspective view that depicts schematically a rotary headlight equipped with a device for measuring the angular position according to one embodiment of the invention comprising at least two Hall effect sensors and a ferromagnetic element;

FIG. 2 is a plan view of FIG. 1 that depicts the headlight in its two extreme angular positions;

FIG. 3 is a diagram that depicts the magnetic field at the Hall effect sensors;

FIG. 6 is a diagram that depicts a magnetic field at the Hall effect sensors for another embodiment that includes a third measurement means.

DETAILED DESCRIPTION OF THE INVENTION

Figure 4:
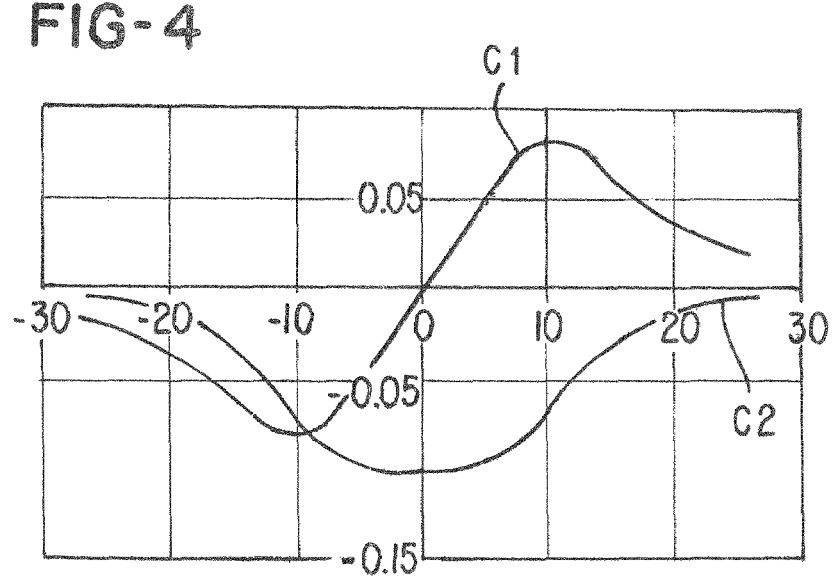
FIG. 4 is a graph that depicts the value of the electrical signals emitted by the Hall effect sensors according to the angular position of the headlight.

For the remainder of the description, there will be adopted, non-limitingly, a longitudinal, vertical and transverse orientation that is fixed with respect to the body of the motor vehicle and that is indicated by the trihedron L, V, T in FIG. 1.

Subsequently, identical, analogous or similar elements will be designated by the same reference numbers.

FIG. 1 depicts a motor vehicle headlight 10 that comprises here a reflector 12 inside which a lamp 14 is mounted. The headlight 10 is able to emit a light beam along an optical axis O of roughly longitudinal orientation.

The headlight 10 is mounted for rotation about a vertical axis A with respect to the body 16 of the motor vehicle. To this end, the headlight 10 comprises two bottom and top swivels 18 of axis A.

The headlight 10 is thus able to be oriented according to several angular positions about the axis A in a range of movement that is delimited by two extreme angular positions. For the remainder of the description, a neutral angular position is defined that corresponds to an angular position that the headlight 10 occupies when it illuminates the road along the longitudinal axis L of the vehicle. The neutral angular position occupies a middle position in the range of movement. Thus the optical axis O of the headlight 10 is able to pivot on each side of the longitudinal axis L of the motor vehicle.

The headlight 10 is driven in rotation by a driving device 20 that comprises here an electric motor 22, for example a stepping motor, which comprises a vertical rotary shaft 24. The motor 22 is mounted so as to be fixed with respect to a body of the motor vehicle 16. A pinion 26 is arranged at a free top end of the shaft 24.

The driving device 20 also comprises a circular toothed sector 28 that extends in a horizontal plane in a fan from a top 29 as far as a peripheral toothed arc 31, the top 29 forming the center of the peripheral toothed arc 31.

The top 29 of the toothed sector 28 is mounted for rotation about the axis A so that the toothed sector 28 is rotationally integral with the headlight 10. The peripheral toothed arc 31 of the toothed sector 28 are meshed with the teeth of the pinion 26 so that the motor 22 is able to drive the headlight 10 in rotation by means of the toothed sector 28.

The driving device 20 also comprises a printed circuit card 30 that lies in a transverse vertical plane that is fixed to the motor 22.

According to the teachings of the invention, the toothed sector 28 carries a ferromagnetic element such as a magnet 32. The magnet 32 is here a cylindrical shape of axis P (FIG. 2). As depicted in FIG. 2, the magnet 32 comprises a south pole S and a north pole N that are each arranged at an axial end portion of the cylindrical magnet 32.

The magnet 32 is here carried by the toothed sector 28 so that its axis P forms the median of the toothed sector 28. The axis P is thus orthogonal to the rotation axis A and secant with the rotation axis A. Non-limitingly, the magnet 32 is offset radially with respect to the axis A. The magnet 32 is thus mounted for rotation about the axis A integrally with the headlight 10.

The magnet 32 emits a magnetic field B that is axisymmetric with respect to the axis P of the magnet 32. A local magnetic field B is defined at any point in space by a vector characterized by its direction and intensity.

The driving device 20 also comprises at least one or a plurality of Hall effect sensors 34A, 34B that are arranged on the printed circuit card 30. The Hall effect sensors 34A, 34B are therefore fixed with respect to the body of the motor vehicle 16.

Each Hall effect sensor 34A, 34B is able to measure the intensity of the local magnetic field B, that is to say at the point in space on which the Hall effect sensor 34A, 34B is arranged, in projection on a given measurement axis M that is oriented towards a given direction. More particularly, each Hall effect sensor 34A, 34B emits an electrical measurement signal Sm whose value represents the measured intensity of the local magnetic field B in projection on the measurement axis M. The value of the electrical signal emitted by the Hall effect sensor 34 can be negative or positive according to the orientation of the measurement axis M.

The sensors 34 are electrically connected with an electronic processing unit 35 (FIG. 1) that is here arranged at least partly on the printed circuit card 30. The electronic processing unit 35 is able to perform operations on the basis of electrical measurement signals S emitted by the sensors 34A, 34B so as to determine the instantaneous angular position of the headlight 10.

The Hall effect sensors 34A, 34B are here arranged so as to be opposite the magnet 32 when the headlight 10 is in its neutral angular position, that is to say the Hall effect sensors 34A, 34B are then aligned with the axis P of the magnet 32. In this neutral angular position the axis P of the magnet 32 is, here non-limitingly, oriented longitudinally.

The Hall effect sensors 34A, 34B are incorporated in the same electronic element. Thus the two sensors 34A, 34B measure the intensity of the local magnetic field B at the same point in space.

For the remainder of the description the term local magnetic field B will relate to the magnetic field at the point in space at which the sensors 34A, 34B are arranged.

According to a variant of the invention that is not shown, each Hall effect sensor 34A, 34B is incorporated in a distinct electronic element. The two Hall effect sensors 34A, 34B are then arranged in the vicinity of each other so as to measure the local magnetic field B approximately at the same point in space.

The first Hall effect sensor 34A is arranged so as to measure the intensity of the local magnetic field B in projection on a first measurement axis M1, which is here transversely oriented as shown in FIG. 3. The first measurement axis M1 is oriented from left to right with reference to FIG. 3.

The second Hall effect sensor 34B is arranged so as to measure the intensity of the magnetic field in projection on a second measurement axis M2 orthogonal to the first measurement axis M1, which is here vertically oriented as shown in FIG. 3. The second measurement axis M2 is oriented from bottom to top with reference to FIG. 3.

According to a variant of the invention that is not shown, the second Hall effect sensor 34B is arranged so as to measure the intensity of the local magnetic field B in projection on a second longitudinally oriented measurement axis.

In the example shown in FIG. 3, the local magnetic field B is shown in projection on a transverse vertical plane for several angular orientations of the headlight 10. The local magnetic field B is thus represented by vectors in solid lines while the projections of the local magnetic field B on the measurement axis M1 and M2 are represented by vectors in broken lines.

The vector B0 corresponds to the local magnetic field B in a transverse vertical plane when the headlight 10 is in its neutral angular position. The vector B0 is here oriented in a vertical direction that corresponds to the second measurement axis M2.

In projection on the first measurement axis M1, the vector B0 thus forms a point. The first Hall effect sensor 34A therefore measures an intensity of 0 tesla.

In projection on the second measurement axis M2, the vector in B0 is unchanged. The second Hall effect sensor 34B therefore measures an intensity equal to the intensity of the vector B0.

The vector B1 depicted in FIG. 3 corresponds to the local magnetic field B in a transverse vertical plane when the headlight 10 is in its first extreme angular position. The vector B1 forms an angle α1 with the vector B0.

In projection on the first axis M1, the vector B1 produces a vector B1M1 whose intensity is equal to the intensity of the vector B1 multiplied by the sine of the angle α1. The first measurement axis M1 being oriented from left to right, the value measured by the first sensor 34A is negative.

In projection on the second axis M2, the vector B1 produces a vector B1M2 whose intensity is equal to the intensity of the vector B1 multiplied by the cosine of the angle α1. The value measured by the second sensor 34B is here positive.

The vector B2 depicted in FIG. 3 corresponds to the local magnetic field B in a transverse vertical plane when the headlight 10 is in its second extreme angular position. The vector B2 forms an angle α2 with the vector B0.

In projection on the first axis M1, the vector B2 produces a vector B2M1 whose intensity is equal to the intensity of the vector B2 multiplied by the sine of the angle α2. The first measurement axis M1 being oriented from left to right, the value measured by the first sensor 34A is positive.

In projection on the second axis M2, the vector B2 produces a vector B2M2 whose intensity is equal to the intensity of the vector B2 multiplied by the cosine of the angle α2. The value measured by the second sensor 34B is here positive.

The graph shown in FIG. 4 comprises a first curve C1 and a second curve C2. The first curve C1 represents the value of the intensity measured by the first Hall effect sensor 34A according to the angular position of the headlight 10, while the second curve C2 represents the value of the intensity measured by the second Hall effect sensor 34B according to the angular position of the headlight 10.

Because of the arrangement of the magnet 32 with respect to the Hall effect sensors 34A, 34B, the two curves C1, C2 are symmetrical with respect to the neutral angular position of the headlight 10. It can be seen that the curve C1 has the shape of a sinusoidal portion that changes sign when the headlight 10 passes its neutral angular position.

The end portions of the first curve C1 correspond to ranges of angular positions of the headlight 10 that are at the two ends of the range of movement. However, it is not possible to determine precisely the angular position of the headlight 10 in these two extreme ranges since two possible angular positions for the headlight 10 correspond to the same value measured by the first sensor 34A.

The invention therefore proposes a simple method for precisely determining the angular position of the headlight 10 throughout its range of movement according to the orientation of the local magnetic field B in projection on a vertical plane that is transverse with respect to the second measurement axis M2. In the context of the invention, when the latter is applied to a dynamic bending light (DBL), the movement is 20° on either side of the neutral position.

To this end, the magnet 32 is arranged and conformed so that the direction of the local magnetic field B changes constantly during the rotation of the headlight 10 and more particularly so that only one direction of the local magnetic field B is associated with each angular position of the headlight 10.

During a first measurement step E1, the intensity of the local magnetic field B" is measured by the two Hall effect sensors 34A, 34B in projection along the two measurement axes M1, M2. The sensors 34A, 34B then communicate the electrical measurement signals Sm1, Sm2 to the electronic processing unit 35.

Then, during a second processing step E2, a value Sr representing the angle of the local magnetic field B with respect to the second measurement axis M2 in the transverse vertical plane is calculated by the electronic processing unit 35.

The electronic processing unit 35 first of all calculates the ratio of the value of the first measurement signal Sm1 to the value of the second measurement signal Sm2. Then, by calculating for example the arctangent function of the ratio thus obtained, the value Sr obtained is here equal to the angle of the local magnetic field B in the vertical plane transverse with respect to the second measurement axis M2. The electronic processing unit 35 therefore performs the following calculation:

$$Sr = \arctan\left[\frac{Sm1}{Sm2}\right]$$

The arctangent function is only one of the functions that can be used and can be replaced by any other mathematical function compatible with the calculation capacities of the electronic processing unit 35.

Figure 5:
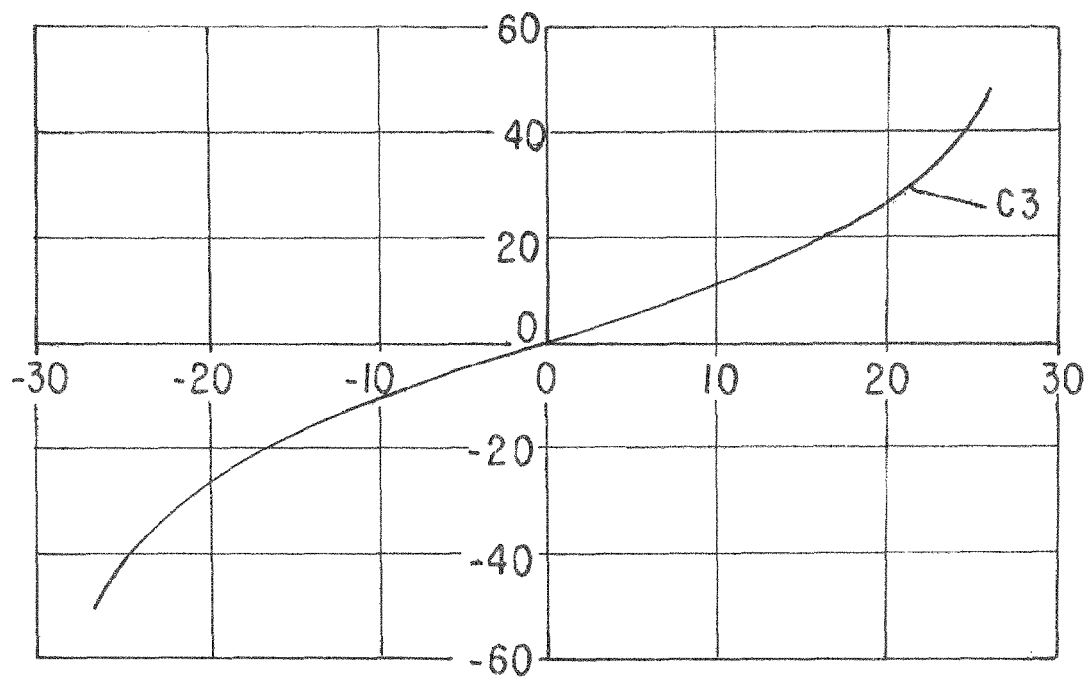
FIG. 5 is a graph that depicts the electronic signal resulting from the calculation made by the electronic processing unit.

As can be seen in FIG. 5, the calculated angle is here linearly proportional to the angular position of the headlight 10 in any range of movement.

According to a variant of the invention that is not shown, the value Sr calculated by the electronic processing unit 35 during the second processing step E2 is an approximation of the real angle of the magnetic field. Thus the curve C3 in FIG. 5 is able to be obtained by simply calculating the ratio of the value of the first measurement signal Sm1 to the value of the second measurement signal Sm2. This calculation method can in particular be adopted when the actual angle of the local magnetic field B does not vary linearly with respect to the angular position of the headlight 10.

According to yet another variant of the invention, the angle of the local magnetic field B does not vary linearly with respect to the angular position of the headlight 10. It is then possible to correct the linearity of the value of Sr calculated with respect to the angular position of the headlight 10 by weighting the values of the measurement signals Sm1, Sm2 with the correction coefficients K1, K2. The electronic processing unit 35 then performs the following calculation:

$$Sr = \arctan\left[\frac{(K1 \times Sm1)}{(K2 \times Sm2)}\right]$$

The coefficients may be constant. They may also be functions of the measurement signals, of the form Ki=f(Smi), or come from a correction table.

At the end of the second processing step E2, when the value representing the angle of the local magnetic field B has been calculated, it is for example compared with the electronic processing unit 35 with a pre-established cartography in order to derive therefrom the instantaneous angular position of the headlight 10.

According to another variant of the invention that is not shown, the device for measuring the angular position of the headlight 10 comprises a third Hall effect sensor 34C that is able to measure the local magnetic field B in projection on a third measurement axis M3 that is orthogonal to the first and second measurement axes M1, M2. For example, the first measurement axis M1 is oriented transversely, the second measurement axis M2 is oriented vertically and the third measurement axis M3 is oriented longitudinally.

Thus, during the measurement step E1, the electronic processing unit 35 receives three measurement signals M1, M2, M3.

During the second processing step, the electronic processing unit 35 is able to calculate the orientation of the local magnetic field B in three dimensions.

For example, the electronic processing unit 35 calculates a first value Sr1 representing the angle that the local magnetic field B forms in projection on a first vertical plane transverse with respect to the second measurement axis M2, as described previously. The electronic processing unit 35 also calculates a second value Sr2 representing the angle that the local magnetic field B forms in projection on a second longitudinal plane transverse with respect to the third measurement axis M3 as described previously.

By combining these two calculated values Sr1, Sr2, it is thus possible to determine the direction of the local magnetic field B in space in three dimensions rather than in a plane in two dimensions. This variant makes it possible to obtain an even more precise measurement of the angular position of the headlight 10 throughout its range of movement by combining the two representative values.

The driving device 20 that is described here is given by way of non-limiting example. The invention is also applicable to other types of driving devices. It will be understood that it suffices for the angular movement of the magnet 32 with respect to the sensors 34A, 34B to be proportional to the angular movement of the headlight 10.

Likewise, the invention is not limited to a magnet 32 that is mounted so as to rotate about the same axis as the headlight 10.

Moreover, the magnet 32 is not limited to the cylindrical shape that is described here. It suffices for the magnet 32 to be conformed so as to emit a magnetic field whose direction varies continuously with the rotation of the headlight at a given point in space and to arrange the Hall effect sensors 34A, 34B at the given point so as to apply the method according to the invention.

More particularly, at the given point, each angular position of the headlight 10 is associated with a single angular orientation of the local magnetic field B and each angular orientation of the local magnetic field B is associated with a single angular position of the headlight 10.

In a variant of the invention that is shown in FIG. 6, the magnet 32 is mounted fixedly with respect to the body of the motor vehicle while the Hall effect sensors 34A, 34B are mounted so as to pivot.

By virtue of such a method, it is possible to measure the angular position of the headlight throughout its range of movement.

In addition, the angle of the local magnetic field B is calculated by calculating the ratio of two measurements Sm1 and Sm2, or of their corrected values, obtained by two similar sensors arranged close to each other. However, the measurement of these sensors are liable to be influenced in the same way by the external conditions such as the variations in temperature and/or the variations in distance between the magnet and the sensors and/or the vibrations. By calculating the angle, the measurement errors are cancelled out by the division operation.

While the method herein described, and the form of apparatus for carrying this method into effect, constitute preferred embodiments of this invention, it is to be understood that the invention is not limited to this precise method and form of apparatus, and that changes may be made in either without departing from the scope of the invention, which is defined in the appended claims.

What is claimed is:

1. A method of determining an instantaneous angular position of a headlight, in particular for a motor vehicle, that is mounted so as to pivot about a pivot axis in a predetermined range of movement delimited by two extreme angular positions, by means of a measuring device that comprises:
   at least one ferromagnetic element that emits a magnetic field that is defined at any point in space by a direction and an intensity,
   at least one first measurement means of measuring an intensity of a magnetic field along a first axis that emit a first electrical measurement signal, said at least one ferromagnetic element being mounted so as to pivot with respect to said at least one first measurement means about said pivot axis between two extreme angular positions corresponding respectively to extreme angular positions of the headlight;
   an electronic processing unit;
   said method comprising a step of measuring the intensity of said magnetic field along said first axis, and a second processing step during which the electronic processing unit calculates an angular position of the headlight from the value of said first electrical measurement signal,
   wherein during the measurement step, the intensity of said magnetic field is measured along at least a second axis orthogonal to said first axis by at least one second measurement means that emits a second electrical measurement signal, and in that, during said second processing step, said electronic processing unit calculates a value representing an angle of said magnetic field with respect to said first axis and said at least a second axis.

2. The method according to claim 1, wherein said at least a second axis is parallel to said pivot axis of said at least one ferromagnetic element.

3. The method according to claim 1, wherein during the first measurement step, said intensity of said magnetic field is measured along a third axis that is orthogonal to said first and second axes by third measurement means, and in that, during said processing step, said electronic processing unit calculates an angle of said magnetic field with respect to the first measurement axis in a plane comprising said first and third axes.

4. The method according to claim 1, wherein during said second processing step, values of first and second electronic measurement signals are weighted by correction coefficients so that said value calculated by the electronic processing unit is linearly proportional to an angular position of the headlight throughout a range of movement of the headlight.

5. A measurement device for implementing the method according to claim 1, wherein said at least one first measurement means and said at least one second measurement means comprises at least two Hall effect sensors that are able to measure the intensity of said magnetic field, respectively, along measurement axes substantially orthogonal to one another and to said at least one ferromagnetic element.

6. The measurement device according to claim 5, wherein said Hall effect sensors are arranged close to one another.

7. The measurement device according to claim 6, wherein said Hall effect sensors are incorporated and housed in a common electronic element.

8. The measurement device according to claim 7, wherein said at least one ferromagnetic element is arranged so that each angular position of the headlight is associated with a single direction of said magnetic field.

9. The measurement device according to claim 5, wherein said at least one ferromagnetic element is offset radially with respect to the pivot axis between the two extreme angular positions corresponding respectively to said extreme angular positions of the headlight.

* * * * *